United States Patent [19]
Chadwick

[11] Patent Number: 6,139,271
[45] Date of Patent: Oct. 31, 2000

[54] HELICOPTER ROTOR BLADE WEIGHTING

[75] Inventor: James R. Chadwick, Bradbury, Calif.

[73] Assignee: Chadwick-Helmuth Company, Inc., El Monte, Calif.

[21] Appl. No.: 09/270,313

[22] Filed: Mar. 16, 1999

Related U.S. Application Data

[60] Provisional application No. 60/078,306, Mar. 17, 1998.

[51] Int. Cl.[7] ........................................ B64C 11/16
[52] U.S. Cl. ...................... 416/145; 416/134 A; 416/139
[58] Field of Search .................... 416/139, 144, 416/145, DIG. 5, 134 A; 74/573 R, 574

[56] References Cited

U.S. PATENT DOCUMENTS

| | | | |
|---|---|---|---|
| 2,494,756 | 1/1950 | Gruetjen | 416/145 |
| 4,150,920 | 4/1979 | Belko et al. | 416/145 |
| 5,273,398 | 12/1993 | Reinfelder et al. | 416/144 |

*Primary Examiner*—Edward K. Look
*Assistant Examiner*—Liam McDowell
*Attorney, Agent, or Firm*—William W. Haefliger

[57] ABSTRACT

Rotor blade weighting apparatus comprising in combination at least one elongated rod carried within a rotor blade, and multiple weights received and retained on the rod, the number of weights adjustable for reducing vibration during rotor rotation.

15 Claims, 5 Drawing Sheets

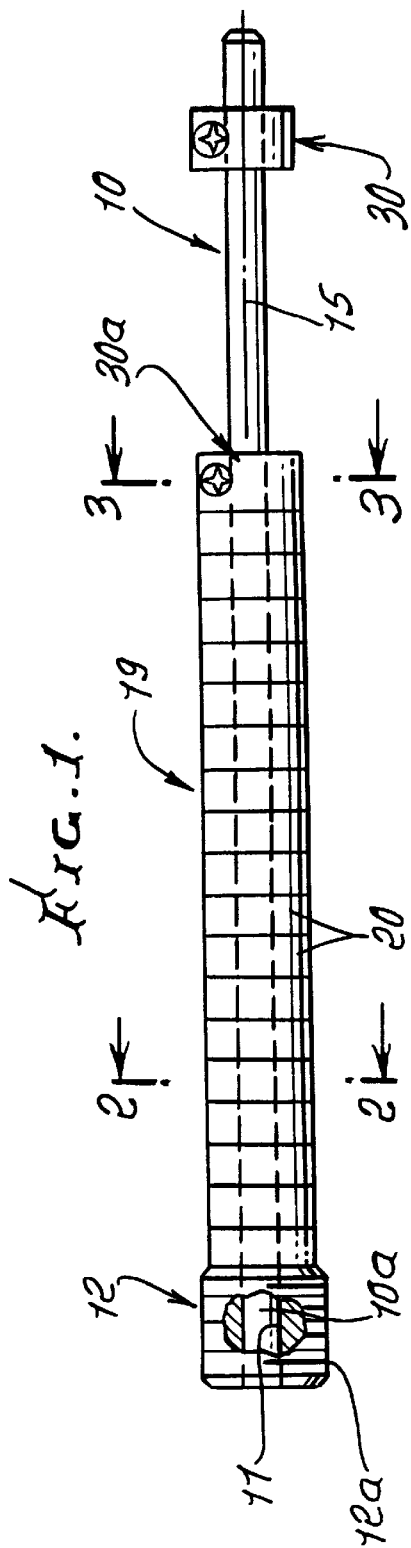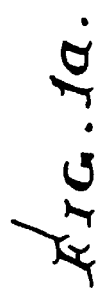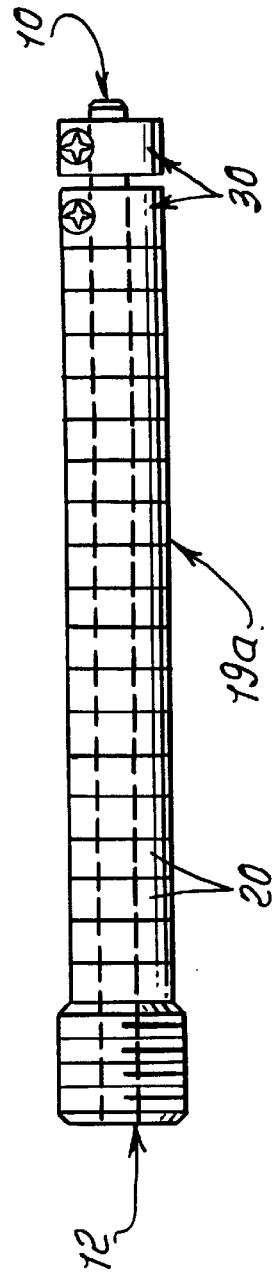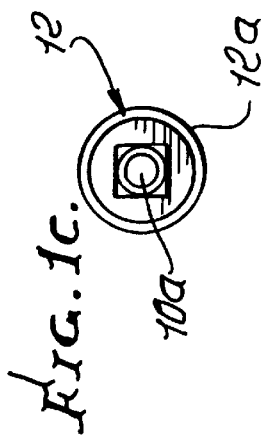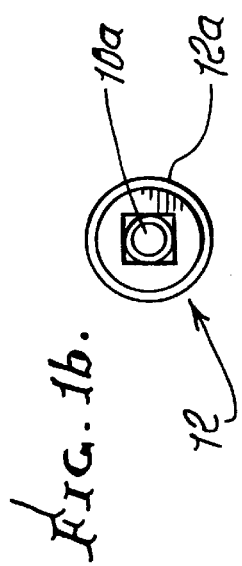

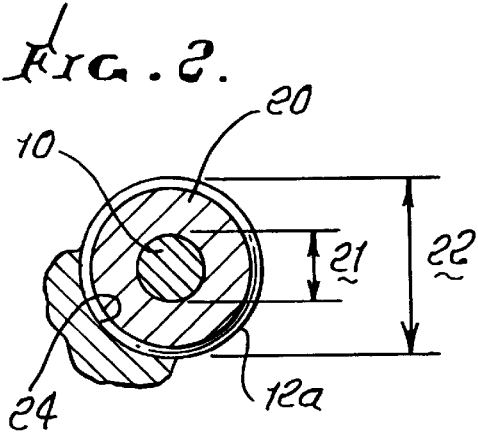
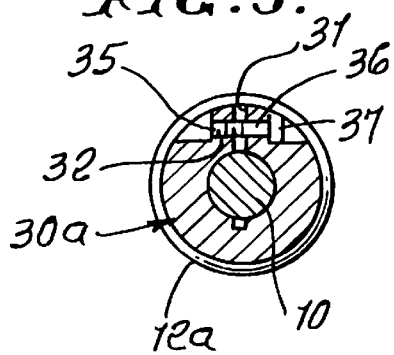
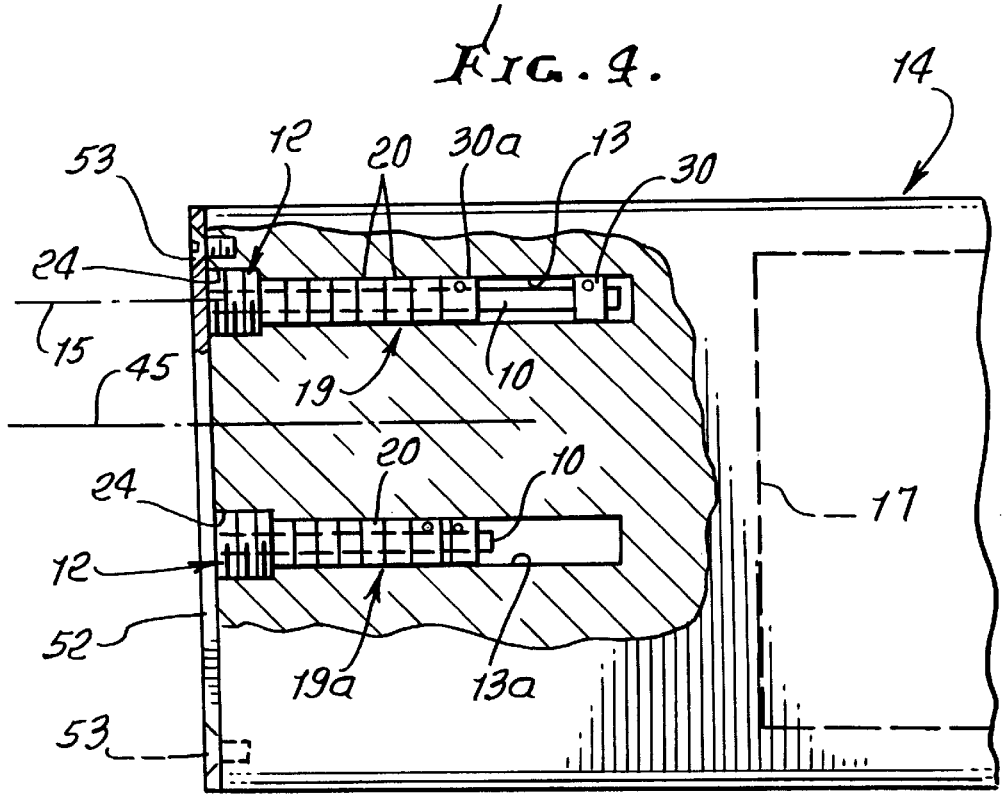

HELICOPTER ROTOR BLADE WEIGHTING

This application claims priority from provisional application Ser. No. 60/078,306, filed Mar. 17, 1998.

BACKGROUND OF THE INVENTION

This invention relates generally to balancing of helicopter rotor blades, and more particularly to employment of weights for balancing of such blades.

Helicopter rotor blades which have provisions for chordwise balance are typically balanced only with great coarseness or difficulty. Rotor blades such as those found on the Boeing Helicopter CH-46 Sea Knight are balanced chordwise only when the blades are newly manufactured or remanufactured.

The original chordwise balance condition is accomplished in manufacturer-operated whirl towers where the new blades are flown with factory "master blades" in order to provide a blade which represents a factory nominal balance condition. This nominal condition exists only on the whirl tower and is inconsequential when the rotor blade is installed in operational use on a fielded aircraft. Factors on the fielded aircraft which render the original whirl tower nominal chordwise balance of little or no importance include, but are not limited to:

1. Aerodynamic interaction with other already installed rotor blades on the fielded aircraft.
2. Condition and wear of dynamic components and other rotor head related structures such as transmissions, drive shafts, and mounts.
3. Condition and history of damage repair on other installed rotor blades on the fielded aircraft.

The most severe effect of lack of chordwise balance comes to rotor blades which have been repaired and have had the balance condition altered as a result of addition or deletion of mass due to those repairs. Without accomplishing balance of the chordwise structure of the blade, the blade can never achieve an optimal dynamic balance condition and will result in the sub-optimal balance of the rotor system in which it is installed.

The standard method of dynamic rotor blade balance is that of manipulation of pitch links, addition or removal of span rotor blade weight, bending of blade trim tabs and adjustment of blade sweep. None of these methods resolves the imbalance of the rotor blades in the chord or cross axis, meaning that all balances which do not include adjustment of the chordwise mass are accomplished in a sub-optimized manner.

SUMMARY OF THE INVENTION

It is a major object of the invention to provide improved rotor blade weighting apparatus that includes
a) at least one elongated rod carried within a rotor blade,
b) multiple weights received and retained on the rod, the number of weights adjustable for reducing vibration during rotor rotation.

As will be seen, the weights on each rod are typically generally annular in configuration, and stacked.

It is a further object to provide for replacement of existing, course chordwise extending weights, with one or more highly tunable and unitized weight packages. Such packages are sized to be placed or received into the same blade cavities as were intended for the original course weight elements.

Yet another object includes the provision of helicopter blade balancing weight kits, each kit including:

1. A threaded plug which secures the weight element in association with the rotor blade and prevents environmental phenomena such as moisture and sand from entering the rotor blade. This plug is the same size and thread as the original equipment furnished with the rotor blade by its manufacturer.
2. A round stainless steel rod affixed to the center of the threaded plug which provides the post upon which the individual weight elements and their retaining clamps are attached. The individual weights and retaining clamps are inserted onto the steel rod and stacked one on the other to the desired total weight required. The rod's length and diameter are configured to the available space in the rotor blade tip architecture and is aircraft-specific.
3. Multiple individual circular tungsten or other dense mass metal weight elements which are assembled into a round cylinder with a central hole having a diameter slightly larger than the stainless steel rod upon which they are stacked. The diameter of the complete weight assembly is such that it can be inserted into the chordwise blade weight provision hole without binding or requiring force. The weight length and diameter of the weight assembly are configured to the available space in the rotor blade tip architecture and is aircraft-specific.
4. Stainless steel retaining clamps of approximately the same diameter as the individual weight elements. The clamps have a central hole having a diameter slightly larger than the stainless steel rod upon which they are installed. The diameter of the retaining clamp is such that it can be inserted into the chordwise blade provision hole without binding or requiring force. A slit is cut through the radius of the clamp and a recessed screw hole which permits a single metal screw to draw the radial split tight, securing the clamp hard against the stainless steel rod. The retaining clamp's length and diameter are configured to the available space in the rotor blade tip architecture and is aircraft-specific.
5. A stainless steel screw is inserted into the screw hole in the stainless steel clamp. Tightening of the screw draws the radial slit together to secure the clamp to the stainless steel rod.

These and other objects and advantages of the invention, as well as the details of an illustrative embodiment, will be more fully understood from the following specification and drawings, in which:

DRAWING DESCRIPTION

FIG. 1 is a plan view of a rod and multiple weight assembly;

FIG. 1a is a view like FIG. 1, showing a second rod and weight assembly;

FIG. 1b is a left end view of the assembly of FIG. 1;

FIG. 1c is a left view of the assembly of FIG. 1a;

FIG. 2 is an enlarged section taken on line 2—2 of FIG. 1;

FIG. 3 is an enlarged section taken on line 3—3 of FIG. 1;

FIG. 4 is a plan view showing two rod and weight sets installed in a helicopter rotor blade at the tip end of the blade, for chordwise balance;

DETAILED DESCRIPTION

Figure 5:
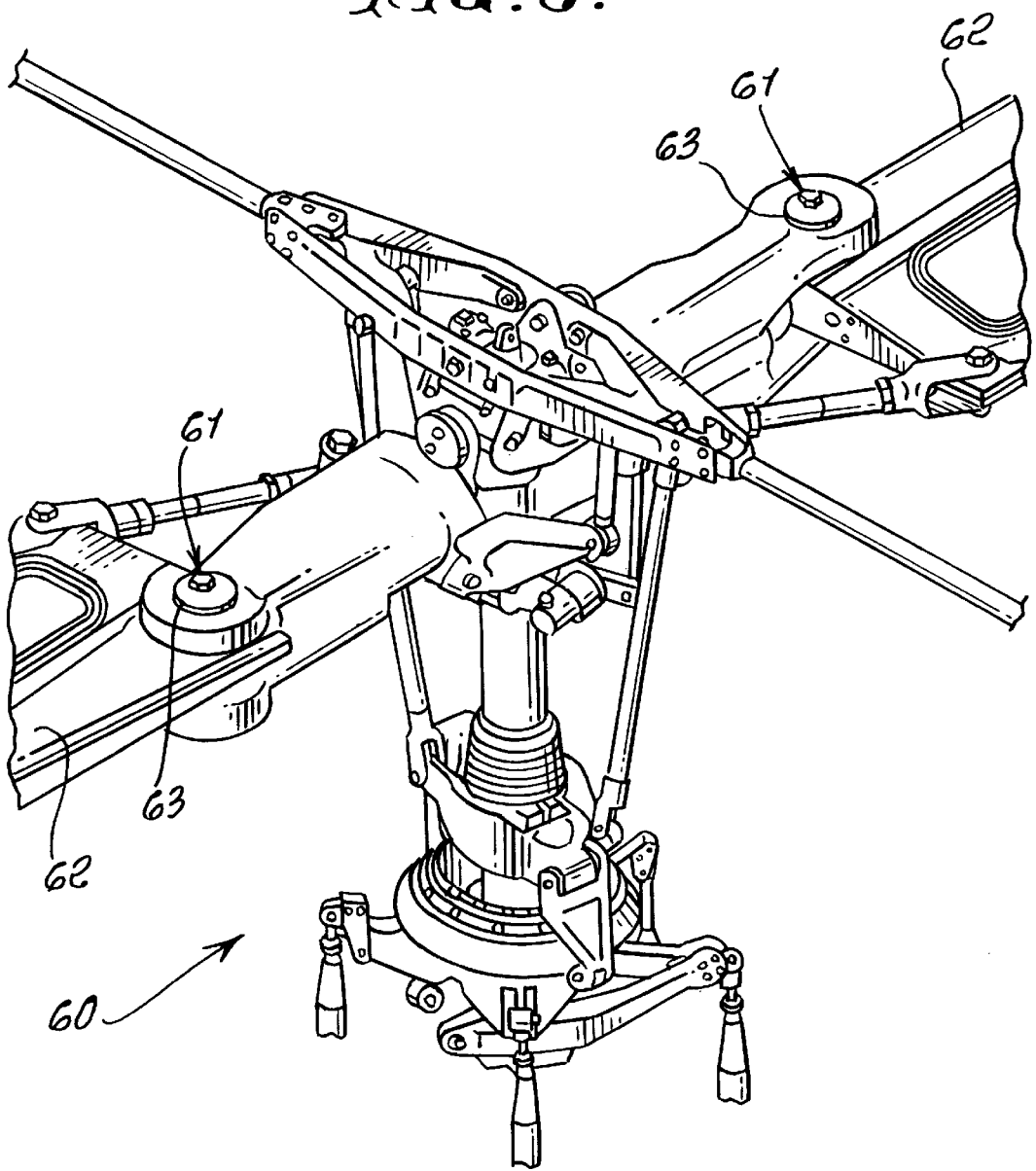
FIG. 5 is a perspective view of a helicopter main rotor system showing the locations of rod and blade set installations.

In FIG. 1, an elongated cylindrical stainless steel rod 10 has and end 10a received in an opening 11 formed in a plug 12, and affixed to the plug. The plug exterior is threaded at 12a for reception in a threaded opening 13 provided in a helicopter rotor blade 14 to anchor the rod, as seen in FIG. 4. In that view the axis 15 of the rod 10 extends in the longitudinal direction of the blade, and is coaxial with the axes of the plug 12 and opening 13, at the tip end of the blade. Plug 12 secures the rod within the tip end of the rotor blade and prevents environmental phenomena such as moisture and sand from entering the rotor blade interior 17.

The assembly 19a of FIG. 1a is like assembly 19 of FIG. 1 and corresponding elements bear the same identifying numbers. The assemblies of FIGS. 1 and 1a comprise a set, as are also shown in FIG. 4, as being spaced in the chordwise direction, for chordwise balance. Assembly 19 is located forward of the blade's center of lift, (see center of lift line 45), and assembly 19a is located to the rear of the center of lift.

A series or row of metallic weights 20 is installed on the rod, the number of weights selected to provide proper balance for the blade. The weights are typically the same in thickness and diameter; however, these dimensions can vary. A typical weight is 50 grams. The weights may desirably consist of tungsten to provide enhanced mass for a given volume. Their inner diameters 21 are typically slightly larger than the rod diameter so as to easily assemble to the rod. Their outer diameters at 22 are typically slightly smaller than the inner diameters of the elongated bores or receptacles 13 and 13a in the helicopter rotor tip end portion.

The weights are retained in end-to-end stacked relation, by a stainless steel retaining clamp 30 which may have the same diameter as the diameters of the weights. The clamp 30 slides onto the rod and is tightened in place to frictionally clamp the rod. For that purpose, the clamp is radially slit at 31, and a screw hole is provided at 32 in one portion of the clamp adjacent the slit to receive the threaded shank 35 of a fastener 36, having a head 37. Tightening of the fastener tightens the C-clamp to the rod, holding the weights in stacked positions. A second clamp 30a on the rod, like clamp 30, is located toward the end 10a of the rod to engage the recess bore and prevent lateral vibration of the rod end. Plug 12 is thread connected to threading in bore 24, near the tip of the blade.

Two such rod and weight assemblies 19 and 19a (i.e. a set) are shown in FIG. 4, and are chordwise offset, relative to the blade. By providing selected and different numbers of such weights 20 on the two rods 10, chordwise balance is achieved, as well as longitudinal balance, relative to the blade. An end cap 52 is attached at 53 to the end of the blade, to enclose the bores or openings 13 and 13a, in the blade tip that receive the two assemblies 19 and 19a. Blade pivot mechanism is indicated at 55, at the root end of the blade in FIG. 5a.

Figure 5A:
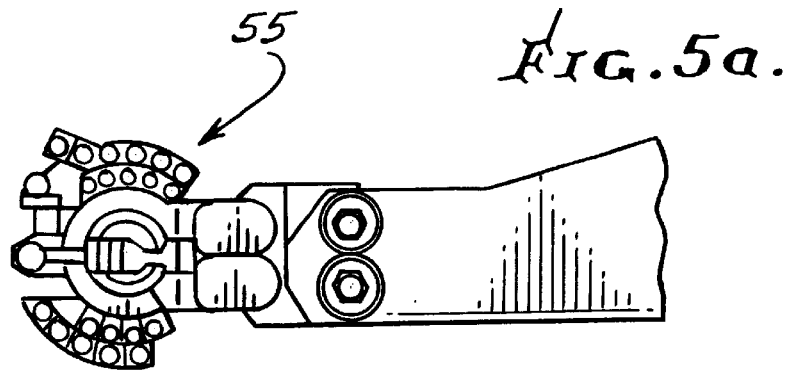
FIG. 5a shows a blade root end assembly.
Figure 6:
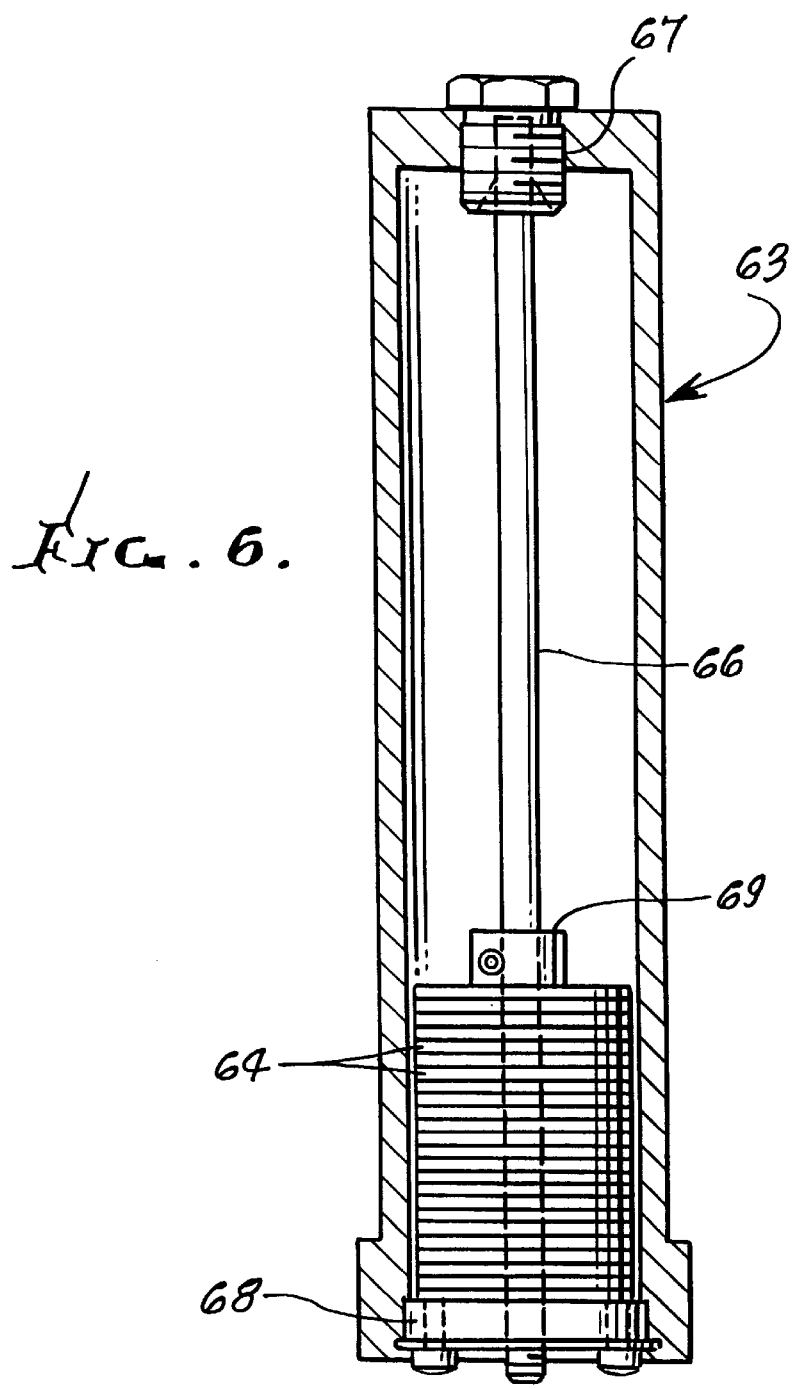
FIG. 6 is an elevation showing in section weights on a pivot rod at the main rotor system.

FIG. 5 shows a helicopter rotor head assembly 60, with horizontal pivot locations 61 for the root ends 62 of the blades. Sleeves 63 at those pivot positions are configured to receive weights 64, corresponding to weights 20 as described above. See FIG. 6 showing weights 64 stacked within bolt or sleeve 63 and on a rod 66 retained in position by end retainers seen at 67 and 68 in FIG. 6. A clamp 69 on rod 66 holds the annular weights in position, as shown. In FIGS. 5 and 6, the shafts and rods extend generally normal to the blade length dimension.

Figure 7:
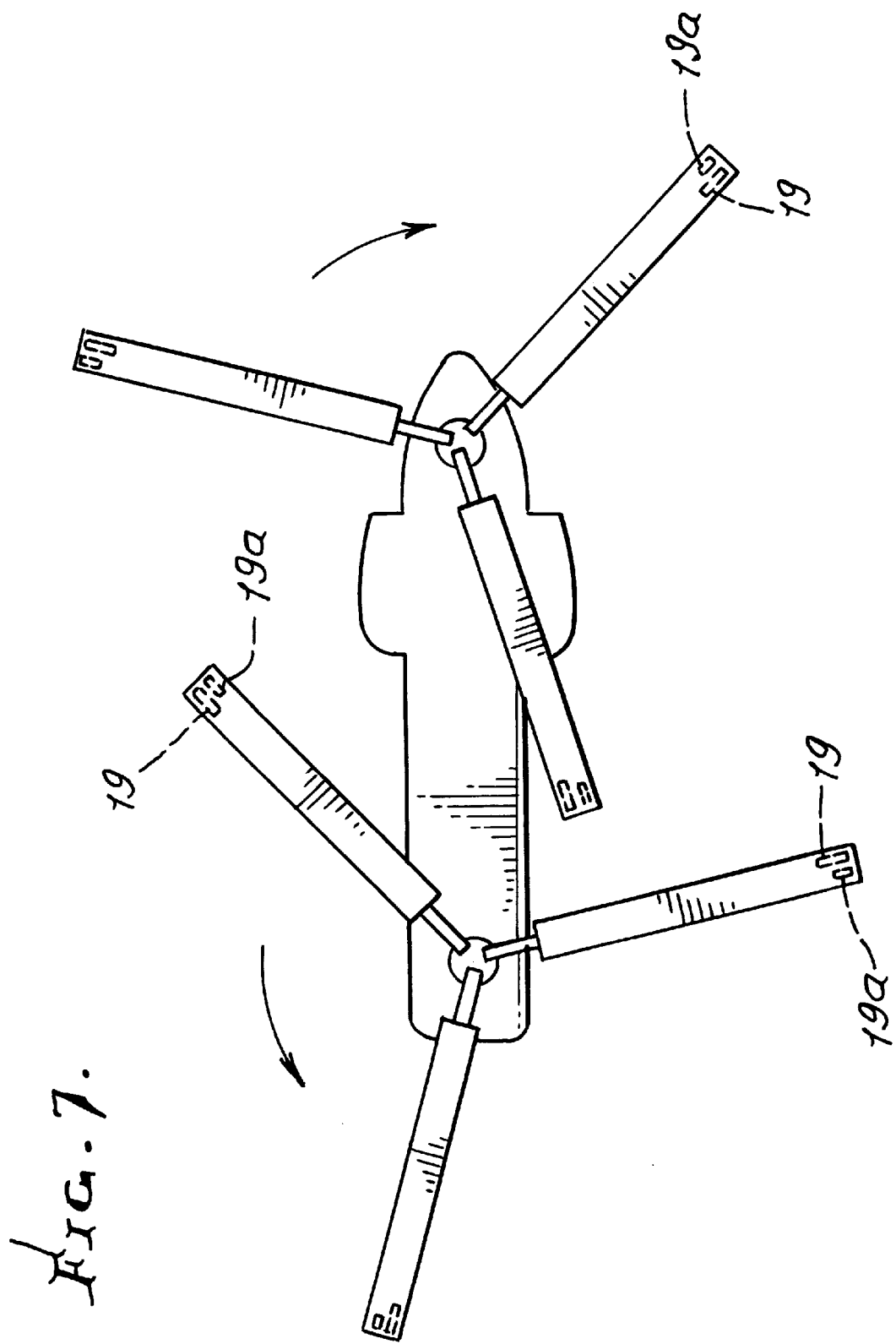
FIG. 7 is a plan view of a helicopter with weight balanced blades.

FIG. 7 shows typical locations of the weight assemblies 19 and 19a on rotor blades 14 of a helicopter.

I claim:

1. Rotor blade weighting apparatus comprising in combination:
   a) at least one elongated rod carried in association with a rotor blade, blade grip or rotor head,
   b) multiple weights received and retained on the rod, the number of weights adjustable for reducing vibration during rotor rotation,
   c) and including a c-shaped holder exerting clamping force transmitted to the rod and retaining the weights in stacked condition.

2. Rotor blade weighting apparatus comprising in combination:
   a) at least one elongated rod carried in association with a rotor blade, blade grip or rotor head,
   b) multiple weights received and retained on the rod, the number of weights adjustable for reducing vibration during rotor rotation,
   c) and including a first c-shaped clamp on the rod retaining the weights in stacked condition.

3. Helicopter blade weighting apparatus comprising in combination:
   a) elongated rods carried in association with multiple rotor blades,
   b) multiple weights received and retained on each rod, the number of weights adjustable for reducing vibration during rotor rotation,
   c) each rod extending generally lengthwise of a blade and proximate the blade tip, there being a retainer on the rod, and the weights on each rod stacked in a row in spaced relation to the retainer which removably retains the rod to the blade,
   d) the retainer having threaded attachment to a bore carried on the blade, and including a c-shaped clamp tightened onto the rod in spaced relation to the retainer.

4. A combination as defined in claim 2 wherein the weights on a rod are annular and stacked, in a row.

5. A combination as defined in claim 3 wherein the weights on each rod are annular.

6. The combination of claim 2 wherein each rod extends generally lengthwise of a blade, and within and proximate the blade tip.

7. The combination of claim 2 wherein each rod extends generally lengthwise of a blade and proximate the blade tip, there being a retainer plug on the rod, and the weights in each rod are annular and stacked on a row, in spaced relation to the plug which removably retains the rod to the blade.

8. The combination of claim 2 wherein the rod extends generally normal to the blade longitudinal extent, and proximate the blade root end.

9. The combination of claim 2 where there are two rods that extend generally lengthwise of the blade, and proximate the blade tip, each rod carrying weights, in a row, the two rods spaced apart chordwise of the blade, there being a weight retaining clamp on each rod.

10. The combination of claim 2 wherein the rod extends generally normal to the blade longitudinal extent, and at the rotor head proximate the blade root end.

11. The combination of claim 2 wherein there are two rods that extend generally lengthwise of the blade, and proximate the blade tip, each rod carrying weights, in a row, the two rods spaced apart chordwise of the blade and within openings in the blade.

12. The combination of claim 2 wherein the weights consist essentially of tungsten.

13. Rotor blade weighting apparatus comprising in combination:
   a) at least one elongated rod carried in association with a rotor blade, blade grip or rotor head,
   b) multiple weights received and retained on the rod, the number of weights adjustable for reducing vibration during rotor rotation,
   c) the weights on each rod being annular and stacked in a row,
   d) each rod extending generally lengthwise of a blade and proximate the blade tip, there being a retainer plug on the rod, and wherein the weights in each rod are annular and stacked on a row, in spaced relation to the plug which removably retains the rod to the blade,
   e) the plug being threaded and having threaded attachment to a bore defined by the rotor blade; and including a c-shaped clamp tightened onto the rod in spaced relation to the plug.

14. The combination of claim 2 including a body on the rod offset from the clamp and weights, and which acts to block lateral vibration of the rod within the rotor blades.

15. The combination of claim 14 including a threaded plug on the rod for attaching the end to the blade and within a blade recess so that the plug is closer to the blade tip than the weight or clamp.

* * * * *